Patented Apr. 24, 1951

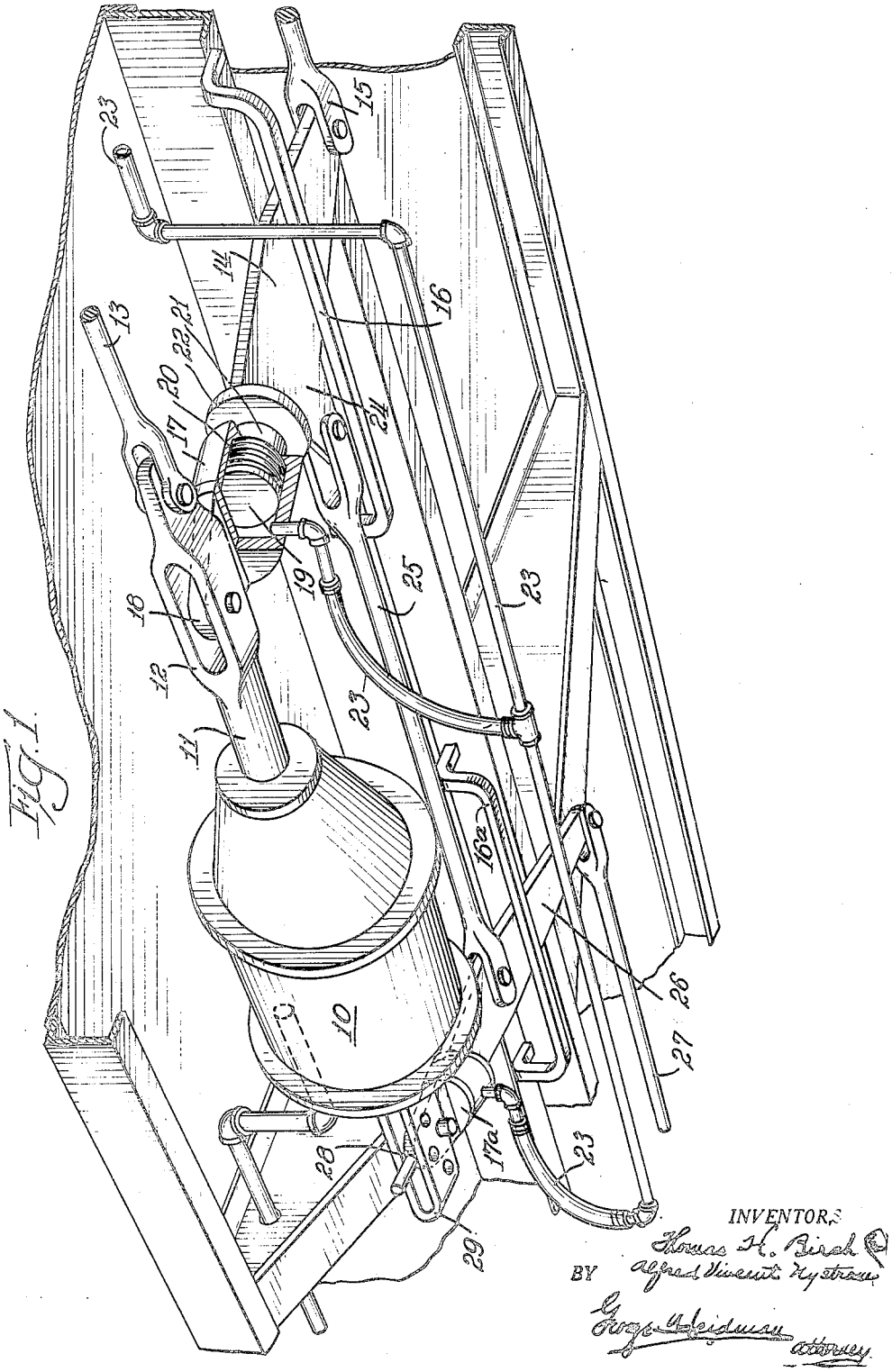

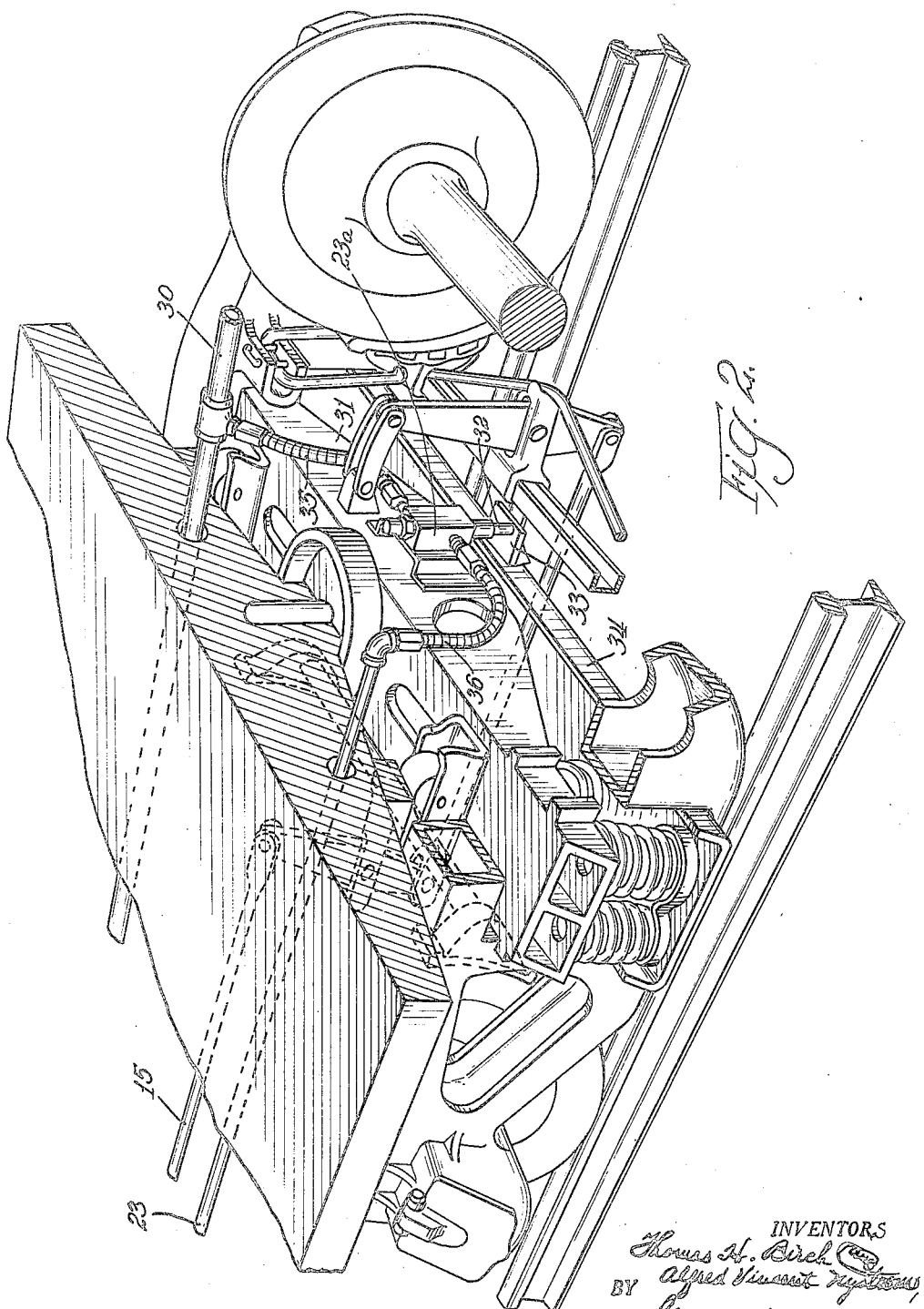

2,549,957

UNITED STATES PATENT OFFICE 2,549,957

LOAD COMPENSATING BRAKE ARRANGEMENT

Thomas H. Birch and Alfred Vincent Nystrom, Milwaukee, Wis.; said Nystrom assignor to said Birch Application August 23, 1948, Serial No. 45,755

4 Claims. (Cl. 188—195)

Our invention relates to the brake cylinder levers and involves means having air connection with the brake air pipe, through the medium of a load affected element, whereby the relation or distance between the lever connecting link pivots and the pivots at the outer end or power arms of the levers may be regulated or controlled in keeping with the car load.

The invention contemplates the provision of means whereby the power arms of the cylinder live lever and of the cylinder fulcrum or floating lever are lengthened as the car is placed under a load; said means being designed to lengthen the power arms of both levers at the same ratio by increasing the length of the power arms relative to the pivotal connections of the connecting link between both levers and the outer ends of the power arms of the levers during a loaded condition of the car and thus provide a load compensating arrangement whereby the force transmitted to the top rods of the brake rigging is increased in keeping with the increased load of the car.

The foregoing objects and the advantages of our invention will be readily comprehended from the detailed description of the accompanying drawing wherein—

Figure 1 is a perspective view, looking upwardly rearwardly of a portion of a car underframe, showing an air cylinder with our improved levers and their connecting link and a portion of a compressed air connection.

Figure 2 is a perspective view of a freight car truck and portions of the brake rigging with portions of the truck frame and body bolster broken away and disclosing the valved air connection between the source of air supply and our improved compensating mechanism.

In the particular exemplification disclosed in Figure 1, 10 represents the usual air cylinder whose push rod 11 is shown provided with a yoke like portion 12 to which link or rod 13 is pivotally connected and which leads to the usual truck lever of the brake mechanism not shown. The yoke like portion 12 provides pivotal mounting for the power arm of the live lever 14 whose opposite end has a truck lever controlling rod pivotally connected thereto, a portion of said rod being shown at 15. The lever 14 passes through and is supported by the usual lever guide 16.

The outer end of the power arm of live lever 14 is provided with a small air cylinder 17, the closed end whereof has a boss or apertured ear as at 18 which is pivotally mounted in the yoke like portion 12. The cylinder 17 is provided with a diaphragm or piston 19 whose stem is surrounded by a coil spring 20 whose one end seats against the piston 19 while the other end is shown held or seated against the inturned flange 21 at the outer end of the cylinder 17. The outer end of piston 19 is provided with a collar or coupling member 22 which is intimately secured to the lever 14. The cylinder 17 and its piston 19 are disposed lengthwise of the lever and constitute a sectional part of the lever. The spring 20 normally forces the piston 19 toward the closed or head end of the cylinder 17; and the closed end of the cylinder rearward or inward of the piston is intended to receive air by means of the conduit or hose 23 which is intended to have connection preferably through the medium of a control or three-way valve—shown at 23ª in Figure 2—which in turn is connected with the usual train line pipe employed in conventional railroad air brake systems; a portion of the train air line being shown at 30 in Figure 2.

The control valve mentioned may be of a suitable plunger type similar to that disclosed in our pending application, "Load Compensating Auxiliary Brake Cylinder and Mounting," Serial No. 45,754, filed August 23, 1948, now abandoned; namely, a three-way valve 23ª mounted vertically on the truck bolster 31; the plunger 32 of the valve extending vertically into proximity with a suitable bracket 33, secured, preferably on the usual spring plank 34. As the car load on the bolster 31 increases and depresses the bolster, the valve plunger 32 will engage with and be actuated by the bracket 33, allowing air from train line 30 to flow through connection 35, valve 23ª and hose connection 36, into conduit 23.

That is to say, as air from the train pipe 30 is admitted to conduit 23 and into the closed end of the small cylinder 17, the piston 19 will be moved outward and thereby extend or lengthen the power arm of live lever 14 and consequently increase its power for more efficient braking force and brake application.

The live lever 14, intermediate its ends, is shown provided with a rearwardly disposed lobe 24 to which one end of connecting rod 25 is pivotally connected, while the other end of rod 25 is pivotally connected to an intermediate portion of the cylinder fulcrum lever or floating lever 26 whose free end, slidingly supported by guide 16ª, has rod 27 pivotally connected thereto; rod 27 (of which only a portion is shown) being, as usual, connected with one of the truck levers.

The swiveled end of lever 26 also is shown provided with a small air cylinder 17ª, similar to cylinder 17 of the live lever, provided with a spring controlled piston whose push rod or stem is intimately secured to and in alignment with the lever 26 and constitutes a part of the power arm of lever 26.

The closed end or head of the cylinder is provided with an apertured extension 28 which extends into the yoke 29 secured to the head of the air cylinder 10; the yoke 29 preferably being shown provided with a plurality of pivot pin receiving holes to permit angular adjustment of the floating lever.

The closed end of the small cylinder 17a, rearward of the piston therein, also is intended, through the medium of a suitable flexible or hose portion of conduit 23 and the three-way or bolster operated control valve 23a to receive air from the train air pipe 30, when the car load is sufficient to cause actuation of the valve 23a. Cylinder 17a, simultaneously with cylinder 17 of the live lever 14, is adapted to receive air during air brake application in the event the load in the car is sufficient to deflect the bolster springs and cause the bolster to move the valve plunger 32 into contact with bracket 33.

When air is admitted to cylinder 17a sufficient to overcome the piston retracting action of the coil spring within the cylinder (similar to coil spring 20), the power arm of lever 26 also will become lengthened and increase the brake force transmitted through rod 27 to the truck lever.

As is evident from the construction shown and described, when the small cylinders are charged, the connecting rod is shifted farther from the fixed pivotal connections at the outer ends of the power arms of the levers.

As is apparent from the drawing when brake applications are made with the loaded car, the lengths of the pivoted outer ends of the power arms of both levers are increased in keeping with the added car load. With a train of loaded cars, the brake force obtained with the usual brake rigging automatically decreases with the number of cars or increased train load with the result that the stopping distance of the train far exceeds that which would be obtained if the cars were empty. With our improved mechanism this serious difficulty is overcome and safer train operation provided, as approximately the same brake force on loaded cars that exists with empty cars will be obtained.

We have shown and described what we believe to be the simplest embodiment of our invention, but certain modifications are possible and may be made without, however, departing from the spirit of our invention as defined in the appended claims.

What we claim is:

1. Load compensating brake mechanism for railroad cars comprising, in combination with the brake air supply, a brake cylinder, a live lever and a floating lever pivotally associated with said cylinder and a connecting rod pivotally connected at its ends with intermediate portions of said levers, air cylinders with air actuated pistons constituting portions of said levers, said cylinders being adapted to receive air from said air supply whereby said pistons are extended and the power arms of said levers thereby automatically lengthened during brake application, and means whereby said power arms are contracted and restored to normal condition.

2. Load compensating brake mechanism for railroad cars comprising, in combination with the train air line, an air brake cylinder, cylinder levers pivotally associated with said cylinder; auxiliary air cylinders arranged at the inner ends of said levers and having pistons secured to and constituting the inner ends of said levers; a valved connection between the train air line and said auxiliary cylinders adapted to admit air to said cylinders when the car load exceeds a prearranged amount, whereby said pistons are extended and the power arms of said levers lengthened during brake application.

3. In auxiliary brake operating mechanism, the combination of the brake cylinder air supply line, and the brake cylinder levers of the brake rigging of a railroad car with a spring supported bolster; with an auxiliary air cylinder secured at the inner end of each lever and provided with a piston secured to and constituting the inner end of the lever, an air connection between the air supply line and said auxiliary air cylinders adapted to be opened when said bolster is load depressed, and means whereby said connection is closed when the bolster returns to normal position.

4. Auxiliary brake operating mechanism comprising, in combination with the brake cylinder air supply pipe of a railroad car, the brake cylinder levers of the car brake rigging and a spring supported bolster; air cylinders secured adjacent the inner ends of said levers and provided with pistons which constitute portions of the power arms of said levers; a three-way air valve secured to said bolster and having a piston with a vertically movable push rod; air conveying conduits between the air supply pipe and said valve and between the latter and said air cylinders at the inner ends of said levers; and means secured to the car truck adapted to engage said piston push rod when the bolster is depressed by the car load, whereby air is admitted to said air cylinders during brake application and the power arms of said levers extended.

THOMAS H. BIRCH.
ALFRED VINCENT NYSTROM.

REFERENCES CITED

The following references are of record in the file of this patent:

UNITED STATES PATENTS

| Number | Name | Date |
| --- | --- | --- |
| 538,851 | Teal | May 7, 1895 |
| 908,246 | Gray et al. | Dec. 29, 1908 |
| 2,155,225 | Hewitt | Apr. 18, 1939 |

FOREIGN PATENTS

| Number | Country | Date |
| --- | --- | --- |
| 408,706 | Germany | Aug. 18, 1923 |